(12) United States Patent
Norman et al.

(10) Patent No.: US 10,492,979 B2
(45) Date of Patent: Dec. 3, 2019

(54) MASSAGE DEVICE FOR A VEHICLE SEAT

(71) Applicant: KONGSBERG AUTOMOTIVE AB, Mullsjoe (SE)

(72) Inventors: Ronny Norman, Habo (SE); Jari Saren, Norrahammar (SE)

(73) Assignee: KONGSBERG AUTOMOTIVE AB, Mullsjoe (SE)

( * ) Notice: Subject to any disclaimer, the term of this patent is extended or adjusted under 35 U.S.C. 154(b) by 795 days.

(21) Appl. No.: 15/093,421

(22) Filed: Apr. 7, 2016

(65) Prior Publication Data

US 2016/0296413 A1 Oct. 13, 2016

(30) Foreign Application Priority Data

Apr. 9, 2015 (DE) .................. 10 2015 105 371

(51) Int. Cl.
*A61H 9/00* (2006.01)
(52) U.S. Cl.
CPC ..... *A61H 9/0078* (2013.01); *A61H 2205/081* (2013.01); *A61H 2205/086* (2013.01)
(58) Field of Classification Search
CPC ........ A61H 9/00; A61H 9/005; A61H 9/0078; A61H 9/0092; A61H 9/007; A61H 2201/0103; A61H 2201/0157; A61H 2201/12; A61H 2201/1207; A61H 2201/1623; A61H 2201/1626; A61H 2205/08; A61H 23/00; A47C 27/00; A47C 27/081; A47C 27/088; A61G 7/1025

See application file for complete search history.

(56) References Cited

U.S. PATENT DOCUMENTS

| | | | |
|---|---|---|---|
| 3,391,692 A * | 7/1968 | Spielberg | A61H 9/0078 601/152 |
| 5,135,282 A | 8/1992 | Pappers | |
| 5,558,398 A * | 9/1996 | Santos | A47C 4/54 297/284.3 |
| 5,711,575 A * | 1/1998 | Hand | A47C 7/425 297/284.6 |
| 6,203,510 B1 * | 3/2001 | Takeuchi | A61H 9/0078 601/152 |
| 6,361,512 B1 * | 3/2002 | Mackay | A61H 9/0078 601/149 |
| 6,916,300 B2 * | 7/2005 | Hester | A61H 23/04 297/284.6 |

(Continued)

*Primary Examiner* — Justine R Yu
*Assistant Examiner* — Matthew R Moon
(74) *Attorney, Agent, or Firm* — Cantor Colburn LLP

(57) ABSTRACT

A massage device includes a linear series of inflatable massage cells, a common supply and venting line, an air pump, a controllable valve, a control unit, and a passive flow restrictor. The cells are arranged in succession and adapted to be disposed beneath a seat cover. The cells include a primary massage cell and a secondary massage cell arranged in a longitudinal direction. The line is in communication with the primary and secondary massage cells. The pump is connected to the line. The control unit is arranged for carrying out massage functions by controlling the compressed air pump and the valve according to a predetermined sequence set by a user for the controlled inflation and controlled venting of the linear massage cells. The flow restrictor interposes the line, and is spaced between the primary massage cell and the secondary massage cell.

20 Claims, 11 Drawing Sheets

(56) References Cited

U.S. PATENT DOCUMENTS

| | | | |
|---|---|---|---|
| 2005/0070828 A1* | 3/2005 | Hampson | A61F 5/012 601/152 |
| 2010/0031449 A1* | 2/2010 | Cheng | A61H 9/0078 5/713 |
| 2012/0143108 A1* | 6/2012 | Bocsanyi | F15B 13/081 601/148 |
| 2014/0276296 A1* | 9/2014 | Mansur, Jr. | A61H 9/0078 601/152 |
| 2015/0157521 A1* | 6/2015 | Williams | A47C 27/088 5/81.1 R |
| 2016/0058654 A1* | 3/2016 | Denson | A61H 9/0078 601/150 |
| 2017/0224577 A1* | 8/2017 | Cartier | A61H 9/0078 |
| 2017/0231861 A1* | 8/2017 | Noso | A47C 9/00 601/149 |

* cited by examiner

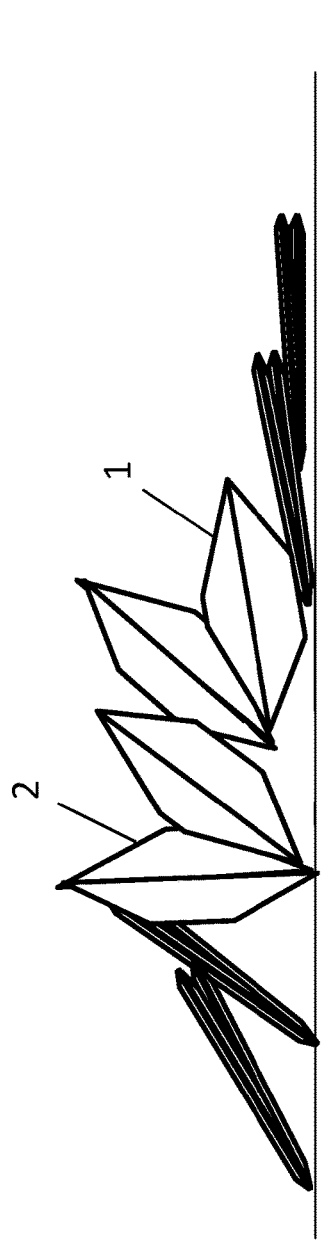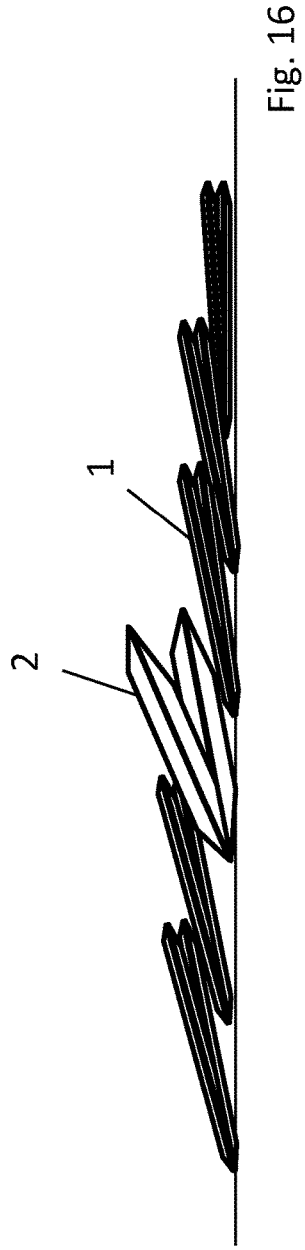

MASSAGE DEVICE FOR A VEHICLE SEAT

CROSS REFERENCE TO RELATED APPLICATIONS

The present application claims the benefit of German Patent Application 10 2015 105 371.3 filed Apr. 9, 2015, the contents of which are incorporated by reference herein in their entirety.

BACKGROUND OF THE DISCLOSURE

The subject matter disclosed herein relates to a massage device for a vehicle seat.

Massage devices for a backrest of a vehicle seat have been proposed, such as for example, in U.S. Pat. No. 5,135,282. A linear series or sequence of inflatable massage cells is arranged in the vicinity of the inner surface of the cover of the backrest of the vehicle seat. More than one linear series of massage cells may also be arranged in parallel and adjacent to one another in the backrest, said massage cells then being simultaneously operated in order to carry out a sequential inflation and venting of the massage cells along the linear sequence of massage cells. Such a sequential inflation and venting of the massage cells along the linear series causes a deformation which propagates in a wave-like manner along surface of the backrest, which propagating deformation is accompanied by a force acting on the back of the driver, which force is directed transverse to the surface of the backrest. Such a pushing force which propagates along the linear series of massage cells is particularly desired for a good massage effect. The massage device has a supply line structure including supply and venting lines, in particular a supply line is provided which connects the successive massage cells in series. Moreover, a venting line is provided which accordingly connects the sequence of successive massage cells in series. The venting line may be opened relative to the surrounding atmosphere in order to vent the massage cells. In order to produce inflation along the linear series of massage cells propagating in a wave-like manner, and accordingly to cause venting progressing in a wave-like manner along the linear series of massage cells, or in order to cause the expansion of individual massage cells, a valve arrangement with a plurality of controllable valves and a control unit for said valves is present. In particular, a controllable valve is present at the start of the supply line upstream of the first massage cell, and a controllable valve is present between each pair of successive adjacent massage cells. The venting line is likewise provided with controllable valves. In order to start an inflation cycle, initially the valve upstream of the first cell in the linear series is opened and as a result the first massage cell is supplied with compressed air from the compressed air pump via the supply line. After inflation of the first massage cell, the control unit opens the valve to the second massage cell etc., until all massage cells are inflated. Subsequently, a sequential venting of the massage cells begins in reverse sequence. In the massage device disclosed in U.S. Pat. No. 5,135,282 the massage cells are spaced apart from each other along the linear series of massage cells, i.e. between each pair of adjacent massage cells a gap remains.

Moreover, further structures of supply line and valve arrangements are known, such structures permitting that each massage cell in the linear sequence of massage cells is selectively inflated or vented individually and independently of all of the other massage cells, i.e. the sequence of massage cells is not connected "in series", but a supply line controlled by a controllable valve is provided for each massage cell individually. Such a structure of supply and venting lines with associated valves permits to cause a deformation propagating in a wave-like manner, by inflation propagating along the linear series of massage cells, wherein the wavelength of the deformation propagating in a wave-like manner may be substantially smaller than the longitudinal extension of the linear series, i.e. in each case only one or very few neighboring massage cells are inflated to a maximum extent, whilst the next neighboring massage cell is already in the state of starting inflation and the preceding massage cell is already being vented.

Massage devices of the type as described above which, due to the deformation in the seat surface propagating in a wave-like manner, achieve a good massage effect, are of rather complicated design since a large number of valves is needed for control, in the worst case two valves per massage cell for controlling supply and venting of the massage cell. This implies rather high costs for the valves themselves on the one hand, and requires on the other hand a rather complicated assembly process involving the provision of a connection between each of the valves and the control unit.

Accordingly, while existing vehicle seats are suitable for their intended purpose the need for improvement remains, particularly in providing a vehicle seat with massage functions that is less expensive and simpler to assemble.

BRIEF DESCRIPTION OF THE DISCLOSURE

According to one aspect of the disclosure, a massage device for a vehicle seat is provided. The message device includes a linear series of inflatable massage cells which are to be arranged in succession below a cover of a backrest or a seat body of the vehicle seat, supply and venting lines to and from the massage cells. A compressed air pump is connected to the supply inventing lines. A valve arrangement is provided for the selective supply of massage cells with compressed air and for the selective venting of massage cells. A control unit is provided for controlling the compressed air pump and the valve arrangement, said control unit being arranged for carrying out massage functions by controlling the compressed air pump and the valve arrangement according to a predetermined sequence set individually by the user for the selective inflation and venting of massage cells in the linear series, wherein the linear series of massage cells comprises a plurality of units in succession in the longitudinal direction, each of which units comprises a primary massage cell which can be inflated and deflated selectively through an associated valve, and at least one secondary massage cell following the primary massage cell, which secondary massage cell is connected to the associated primary massage cell via a supply and venting line, in which supply and venting line a passive flow restrictor is configured such that the inflation and deflation of the secondary massage cell follows the inflation and deflation of the associated primary massage cell with a predetermined time delay.

According to another aspect of the disclosure a method is provided. The method includes providing a linear series of inflatable massage cells which are to be arranged in succession below a cover of a backrest or a seat body of the vehicle seat, supply and venting lines to and from the massage cells. A compressed air pump is provided that is connected to the supply inventing lines. A valve arrangement is provided for the selective supply of massage cells with compressed air and for the selective venting of massage cells. A control unit is provided for controlling the compressed air pump and the valve arrangement. A predetermined sequence is defined for inflating and venting by a user. The massage cells are selectively inflated and vented in the linear series according to the predetermined sequence, wherein the linear series of massage cells comprises a plurality of units in succession in the longitudinal direction. Wherein each of which units comprises a primary massage cell which can be inflated and deflated selectively through an associated valve, and at least one secondary massage cell following the primary massage cell, which secondary massage cell is connected to the associated primary massage cell via a supply and venting line, in which supply and venting line a passive flow restrictor is disposed which is configured such that the inflation and deflation of the secondary massage cell follows the inflation and deflation of the associated primary massage cell with a predetermined time delay.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIGS. 11 to 16 shows schematic side views of a linear series of massage cells, wherein a unit comprising a primary and a secondary massage cell is shown during an inflation and venting cycle. The detailed description explains embodiments of the disclosure, together with advantages and features, by way of example with reference to the drawings.

DETAILED DESCRIPTION OF THE DISCLOSURE

Figure 1:
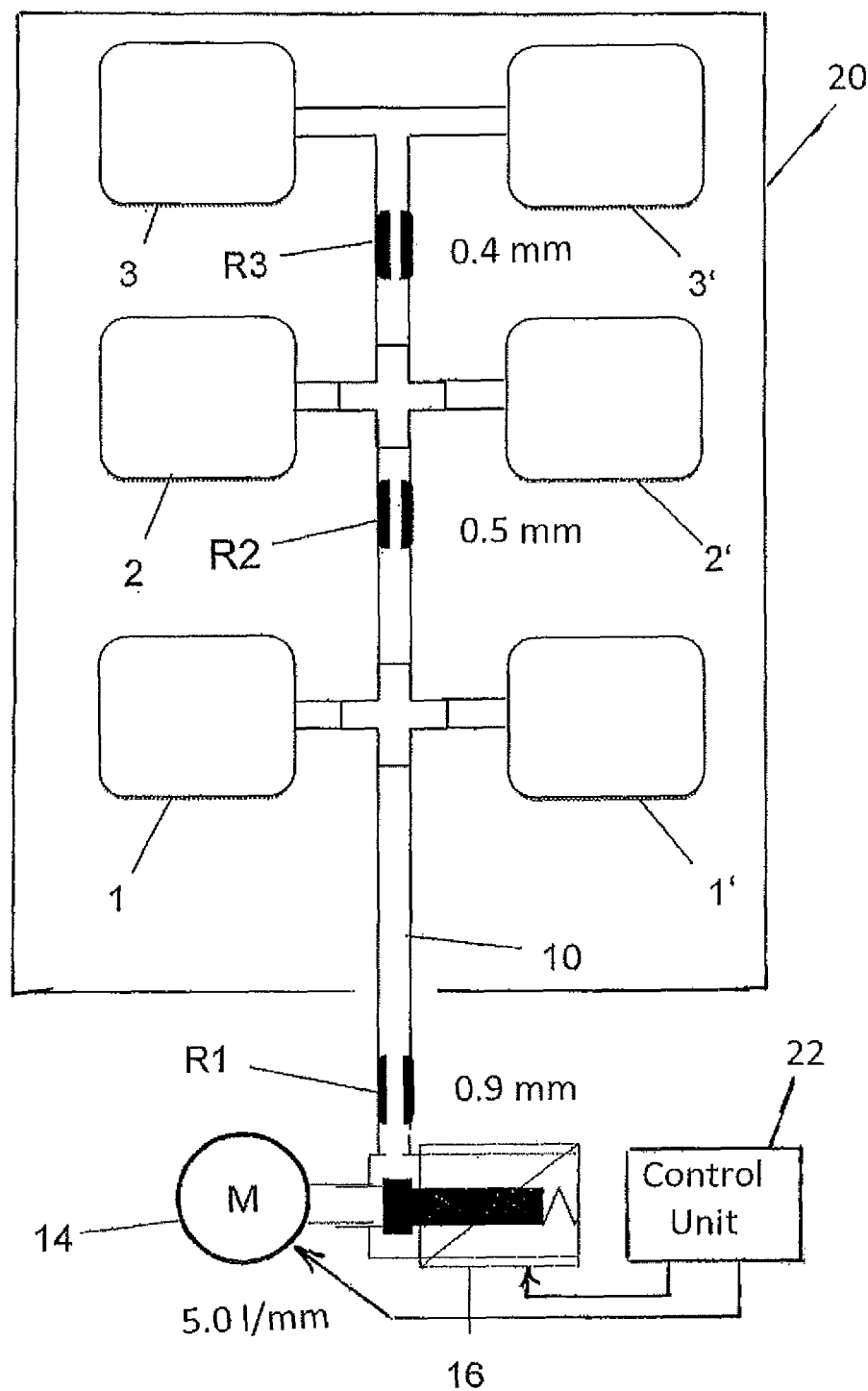
FIG. 1 shows a schematic view of a unit having two parallel arrangements comprising in each case a primary massage cell and two successive secondary massage cells, which unit is to be utilized in a linear series of massage cells in a massage device according to an embodiment.

According to embodiments of the present invention, a linear series of massage cells is arranged such that in its longitudinal direction several units of massage cells are disposed in succession, each of which units comprises a primary massage cell and following the primary massage cell at least one secondary massage cell. A primary massage cell is characterized in that it is connected by an associated valve to a supply and venting line such that the primary massage cell may be individually inflated or individually vented. In each unit there is a secondary massage cell following the primary massage cell in the longitudinal direction of the linear series. A secondary massage cell has no valve assigned to it but is connected to its associated primary massage cell in the unit directly via a supply and venting line in which a passive flow resistor is disposed which is arranged such that inflation and venting of the secondary massage cell passively follows the inflation and venting, respectively, of the associated primary massage cell with a predetermined delay in time.

The flow restrictors in the lines can for example be realized by line segments of reduced inner diameter which increase the flow resistance in dependence on the reduced inner diameter (according to the law of Hagen-Poiseuille the flow resistance increases rapidly with decreasing inner diameter). In an embodiment, the flow resistance of the flow restrictor in the supply and venting line between a primary massage cell and the associated secondary massage cell is set such that the delay time between the point in time when the primary massage cell reached 80% of its volume fill capacity, and the point in time when the associated secondary massage cell reached 80% of its maximum volume fill capacity is in the range between 0.2 and 10 seconds (s). The effective inner diameter of the flow restrictors may be in the range between 0.2 and 2 millimeters (mm). Reference may be made here to an "effective" inner diameter because the passage of the flow restrictor is not necessarily cylindrical; the effective inner diameter is then the inner diameter of a cylindrical nozzle which causes the same pressure drop as the passage of the flow restrictor. The inner diameter of the supply and venting lines may be normally significantly larger than the inner diameter of the flow restrictors such that the flow resistance of the lines themselves does not contribute significantly to the overall flow resistance. In principle, however it is also possible to utilize lines with relatively small inner diameter which is chosen such that at a given length the flow resistance of the line just results in the pressure drop which causes the desired delay between the primary and the secondary massage cell.

In connection with an embodiment it has been found that the feeling and effect of a sequentially propagating inflation along a series of massage cells is achieved when the delay time between subsequent massage cells reaching 80% of their maximal filling volume is set to be within the above-mentioned time range. It is not necessary that a particular primary massage cell is already completely inflated when the next following secondary massage cell starts to be inflated.

In accordance with an embodiment the number of valves needed can be reduced and some of the controllable valves can be replaced by passive flow restrictors of substantially simpler design. In this manner costs are reduced not only by the omission of any valves but also by simplifying the assembly process since less valves have to be connected to the control unit. At the same time a propagating wave-like deformation having a short wave length is still achieved since subsequent primary massage cells can be inflated and vented alternatingly.

If a secondary massage cell is followed by a further secondary massage cell, the flow restrictor in the line between the secondary massage cell and the further secondary massage cell is desired to be likewise dimensioned such that the inflation of the further secondary massage cell up to 80% of its maximal filling volume follows the inflation of the secondary massage cell up to 80% of its maximal filling volume with a time delay in the range between 0.2 s to 10 s.

In an embodiment successive primary and secondary massage cells and successive secondary and primary massage cells in the linear series are disposed overlapping with each other in the longitudinal direction of the linear series such that for each pair of consecutive primary and secondary massage cells the next following massage cell of the pair is partially in superposition with the preceding massage cell. It is desired that also secondary and, if present, further secondary massage cells are disposed to overlap in longitudinal direction of the series such that for each pair of consecutive secondary massage cells the following secondary massage cell is partially overlapping with the preceding secondary massage cell.

In an embodiment, primary and a secondary massage cells in the linear series have the same extension in longitudinal direction of the series, wherein the overlap of successive (primary and secondary, secondary and primary, secondary and further secondary, further secondary and primary) massage cells is within the range 10% to 70% of the longitudinal extension of the massage cells.

In an embodiment the primary and secondary massage cells are configured such that they are, in the inflated state, wedge-shaped when viewed in cross-section through a plane parallel to the longitudinal direction of the linear series of massage cells and perpendicular to a seat cover 20, i.e. in the inflated state the massage cells are higher on one side than on the opposing side opposite in the longitudinal direction of the linear series. In this connection the wedge shape of all of the massage cells in the linear series is oriented in the same direction, i.e. the higher sides of the massage cells in the inflated state all face in one direction, and accordingly the lower sides of the wedge shape of the massage cells in the inflated state also face in one direction which is opposite to the first-mentioned direction. The term "wedge-shape" is not intended to be understood herein in the strict sense as a triangular shape with an acute angle but as a shape which is higher on one side than on the other side in the longitudinal direction of the linear series.

Due to the wedge-shaped configuration of the massage cells in the longitudinal direction of the linear series of the massage cells, upon inflation also a movement component which is oriented in the longitudinal direction of the linear series and thus is oriented in the propagation direction of a wave-like progressing inflation of the massage cells is produced by each massage cell as the massage cells are inflated from a vented flat shape to a wedge-shaped form. Due to the fact that the primary and secondary massage cells are inflated from a flat, vented state to a wedge-shaped inflated configuration, each cell rises more sharply on one side in the longitudinal direction during inflation, which leads to a movement component of the side rising more sharply which rotates or pivots about the side rising less sharply.

In the transition from the flat shape in the vented state to the wedge shape in the inflated state, a movement component is thus produced which is oriented in the longitudinal direction of the linear series of massage cells, said movement component assisting the wave-like propagating movement during sequential inflation of the massage cells, which takes place in the longitudinal direction in a wave-like manner and sequentially over the linear series of massage cells. This longitudinal movement component thus leads to a movement oriented in the longitudinal direction of the series of cells and thus transversely along the body surface of a person seated on the vehicle seat. Also, with the isolated inflation of individual massage cells which are not adjacent, the expansion movement directed perpendicular to the seat surface is superimposed by a movement component transversely thereto due to the formation of a wedge shape. Also this transverse movement component leads to a pulling or pushing massage movement acting transversely to the body surface of a person seated in the vehicle seat.

It turned out that the combination of the measures to arrange the massage cells overlapping in the longitudinal direction and to configure them such that they form a wedge shape when inflated, leads to the improved massage effect due to a bulging movement and the unfolding wedge-shaped cells, with force on the massaged body region acting transversely to the body part bearing against the seat cover 20 (see FIG. 1), wherein the series of primary and secondary massage cells permits to achieve a propagating wave-like bulge having a short wave length.

In an embodiment the side of the wedge shape of the primary and secondary massage cells which is higher in the inflated state, is in this state at least double the height of the opposing lower side in the longitudinal direction.

In an embodiment the primary and secondary massage cells are configured in the manner of a folding bellows wherein the outer folds are connected together on one side so that, after inflation of the folding bellows-like massage cell, the connected side forms the lower side of the wedge shape, as the connected outer folds on this side are not able to move away from one another and; therefore, on the connected side practically no expansion takes place during inflation. By this folding bellows type configuration of the massage cells, wherein the expansion of the folding bellows on one side is prevented by connecting the outer folds, a considerably asymmetrical inflation of the primary and secondary massage cells may be achieved in the longitudinal direction of the linear sequence, or in other words an extreme wedge shape of the primary and secondary massage cells.

In an embodiment the primary and secondary massage cells may be formed in each case by two superimposed folding bellows elements lying on top of each other. Alternatively, the primary and secondary massage cells may be formed in each case by three superimposed folding bellows elements.

Referring now to FIGS. 1, 3, 5, 7, and 8, in each case a unit including a primary and one or two successive massage cells is shown. A massage device according to an embodiment is assembled by assembling these units in a linear row as a linear series of massage cells. In this connection air supply and inflation and venting of each primary massage cell is controlled by a controllable valve which is associated with a supply and venting line connected to the primary massage cell, whereas the secondary massage cell assigned to the primary massage cells passively follows the inflation and venting of the primary massage cell with a time delay, wherein the degree of time delay is determined by the flow resistance of the flow restrictor in the connection path between the primary massage cell and the secondary massage cells. The units which are assembled as a linear series of massage cells for a massage device utilize in the embodiments of FIGS. 1, 3, 5, 7, and 8 massage cells having a rectangular base area of 60×50 mm. In the deflated state the side walls are collapsed, which side walls may be formed in a folding bellows manner. During inflation the side walls are raised and reach a height of 50 mm in the fully inflated state. First, embodiments will be considered in which the side walls on all sides of the cell are raised and lowered. The filling degree of a massage cell can also be expressed as a cell fill height or simply as height which is the height up to which the side walls of the massage cell have already been raised. The fill height therefore is 0 mm for a completely vented cell, and amounts to 50 mm for a completely inflated cell. In case of asymmetrically inflating wedge-shaped cells as discussed further below, the height can be defined as the height of the side that is raised to the highest level in the inflated state.

In the following example the massage cells are made of polyurethane foil having a thickness of 0.5 mm. In principle, also other plastic materials or even fabrics could be used to form the massage cells. Also other foil thicknesses than 0.5 mm, for example 0.375 mm or 0.7 mm, could be used.

Figure 2:
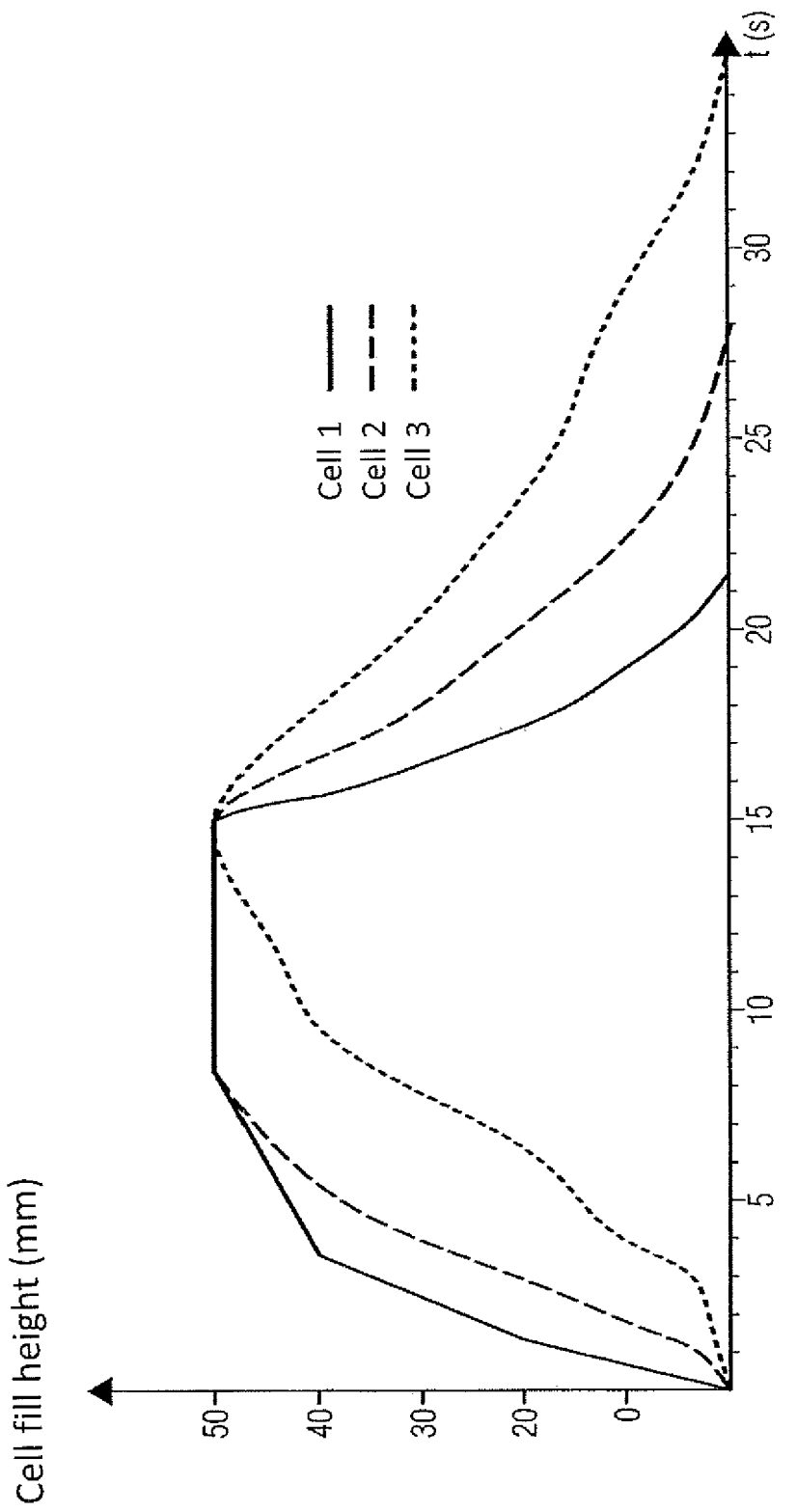
FIG. 2 shows a graph of the height of the primary and the secondary massage cells as a function of time during inflation and venting of the primary massage cell and the secondary massage cells of FIG. 1.

FIG. 2 shows an embodiment of a unit comprising a primary massage cell 1 and two successive secondary massage cells 2 and 3. More precisely, it is a parallel arrangement of two primary massage cells 1, 1', and in each case two secondary massage cells 2, 2' and 3, 3', respectively. In the supply and venting line 10 three flow resistors R1, R2, and R3 are disposed. A pressurized air pump 14 is operated with a pump performance of 6 l/min. under the control of a control unit (not shown). The supply and venting line 10 leading to the primary massage cells 1, 1' is controlled by a controllable valve 16 which is likewise controlled by the control unit. The primary and secondary massage cells have the above described dimensions, namely a base area of 60×50 mm$^2$ and a maximal height of 50 mm, and they are made of a polyurethane foil having a thickness of 0.5 mm.

The first flow restrictor R1 upstream of the primary massage cells 1 and 1' has an effective inner diameter of 0.9 mm. The second flow restrictor R2 downstream of the primary massage cells 1, 1' and upstream of the secondary massage cells 2, 2' has an effective inner diameter of 0.5 mm. The third flow restrictor R3 downstream of the secondary massage cells 2 and 2' and upstream of the further secondary massage cells 3 and 3' has an effective inner diameter of 0.4 mm. The flow restrictors in this and all following examples have a length in flow direction of 5 mm. This arrangement and dimensioning of the flow restrictors R1, R2 and R3 is suitable for providing the desired delay in the inflation/deflation cycle between successive primary and secondary massage cells in the unit shown in FIG. 1.

An inflation/deflation cycle is initiated by the control unit which activates the pump 14 and opens the valve 16 such that the supply and venting line 10 is open for communication to primary massage cells 1, 1' but is closed with respect to the environment. The pressure building up in the primary massage cells 1, 1' does not lead immediately to a corresponding pressure increase in the successive secondary massage cells since the flow restrictors upstream of the secondary massage cells reduce the pressure downstream of the primary massage cells. In FIG. 2 an inflation and venting cycle is shown as a function of time, wherein the height of the massage cells is shown as a function of time. In an embodiment a sequence of the inflating and venting is predetermined and defined by a user. It can be seen that the secondary massage cell 2 starts to inflate only after a few seconds delay with respect to the primary massage cell 1. There is also a delay of about 2 s between the primary massage cell 1 and the secondary massage cell 2 for reaching 80% of the maximal fill volume (40 mm height of the massage cells). The further secondary massage cell 3 is again delayed by a little bit more than 3 s with respect to the secondary massage cell 2. Correspondingly reversed delays are found during venting of the primary and secondary massage cells. During venting pump 14 is switched off, and the valve 16 is adjusted such that the supply and venting line 10 is opened to the ambient atmosphere.

A massage device according to the invention can be formed by assembling several units of primary and secondary massage cells as shown in FIG. 1 in a linear arrangement one after the other, wherein the longitudinal direction of the supply and venting lines 10 corresponds to the longitudinal direction of the linear series of individual units as shown in FIG. 1. Each unit as shown in FIG. 1 has its own, separate supply and venting line. These supply and venting lines are supplied with air from a common pressurized air pump.

Figure 3:
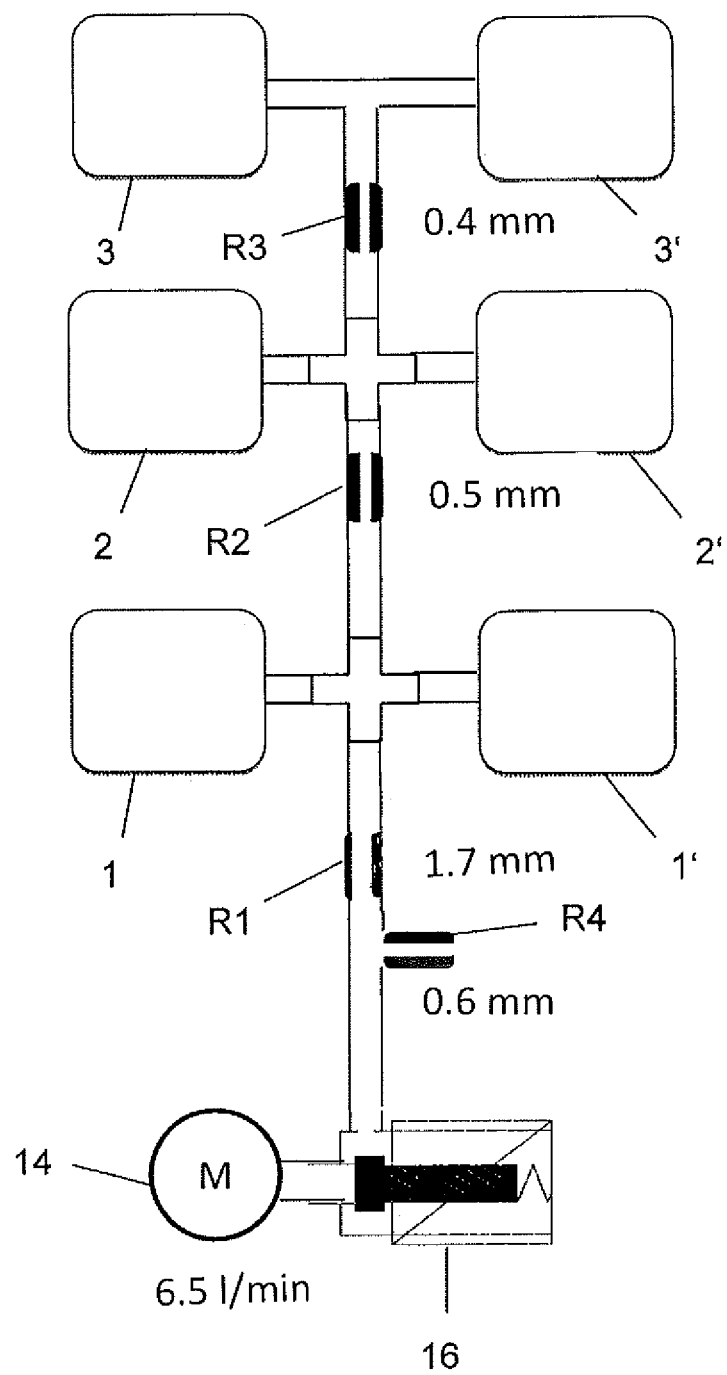
FIG. 3 shows a schematic view of an alternative unit having two parallel arrangements, each arrangement including a primary massage cell and two successive secondary massage cells.
Figure 7:
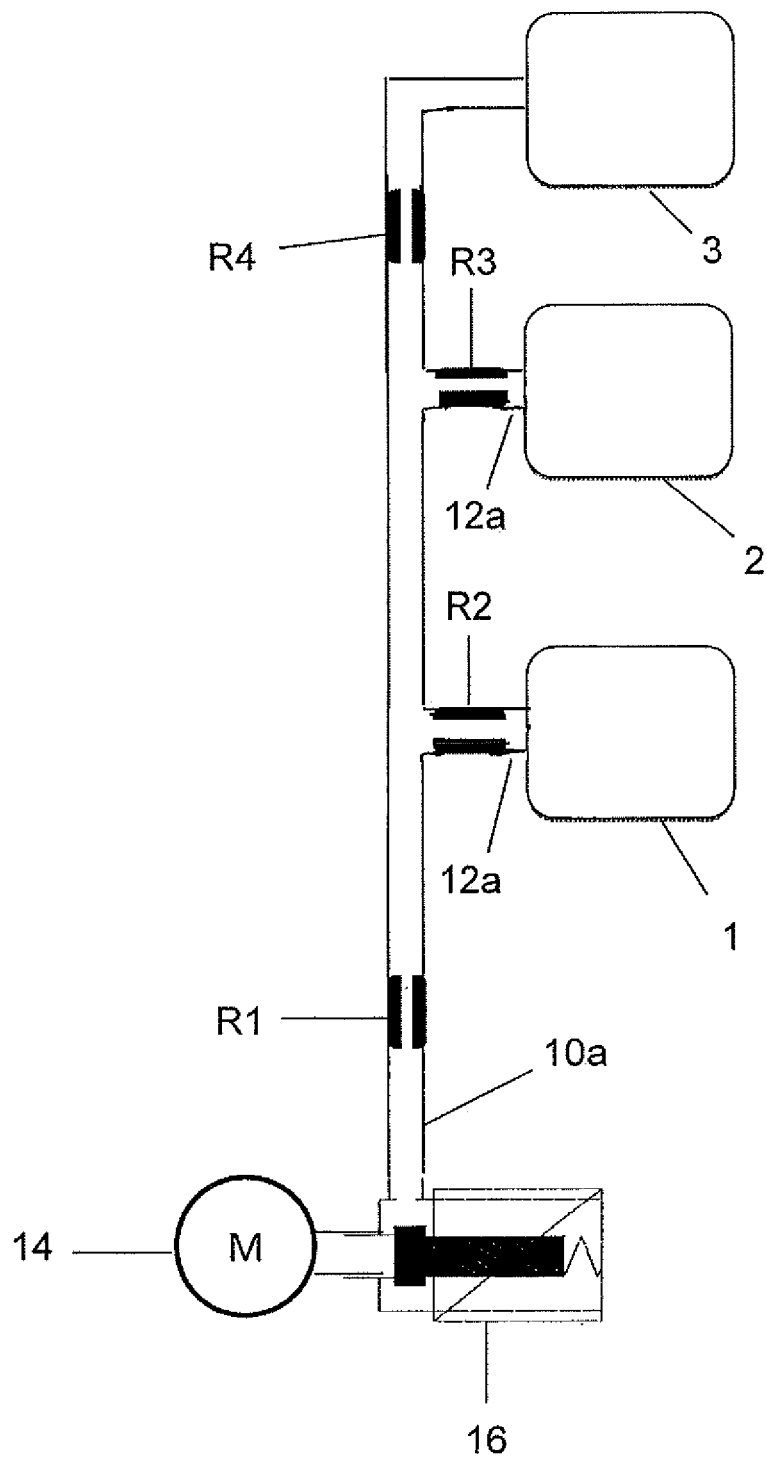
FIG. 7 shows a schematic view of an alternative unit comprising an arrangement of a primary massage cell and two successive secondary massage cells, which unit is to be utilized in a linear series of massage cells in a massage device according to the invention.

FIG. 3 shows a second example for a unit comprising two parallel primary massage cells 1, 1', two parallel secondary massage cells 2, 2' and two parallel further secondary massage cells 3, 3'. As in the example of FIG. 1 two parallel series of a primary massage cell 1, 1', a secondary massage cell 2, 2' and a further secondary massage cell 3, 3', respectively, are connected by a common supply and venting line 10 in which flow restrictors R1, R2 and R3 are disposed, wherein the flow restrictors R1, R2 and R3 are disposed in a serial configuration so that the resistance of each flow restrictor adds up to the total flow resistance to the massage cells downstream of the respective flow restrictor. In this example there is a leakage opening in the supply and venting line in which leakage opening a further flow restrictor R4 is disposed. There is a permanent leakage flow through this leakage opening, both during inflation and during venting. In this example the pressurized air pump 14 is operated with a pump performance of 6.5 l/min. The flow restrictors have effective inner diameters as specified in FIG. 3. FIG. 7 shows the graph of the corresponding fill states of the primary and secondary massage cells as a function of time during an inflation and venting cycle. As can be seen from this graph there is a delay time of about 4 s between the primary massage cell 1 and the secondary massage cell 2, and a delay time of about 2 s between the secondary massage cell 2 and the further secondary massage cell 3.

Figure 4:
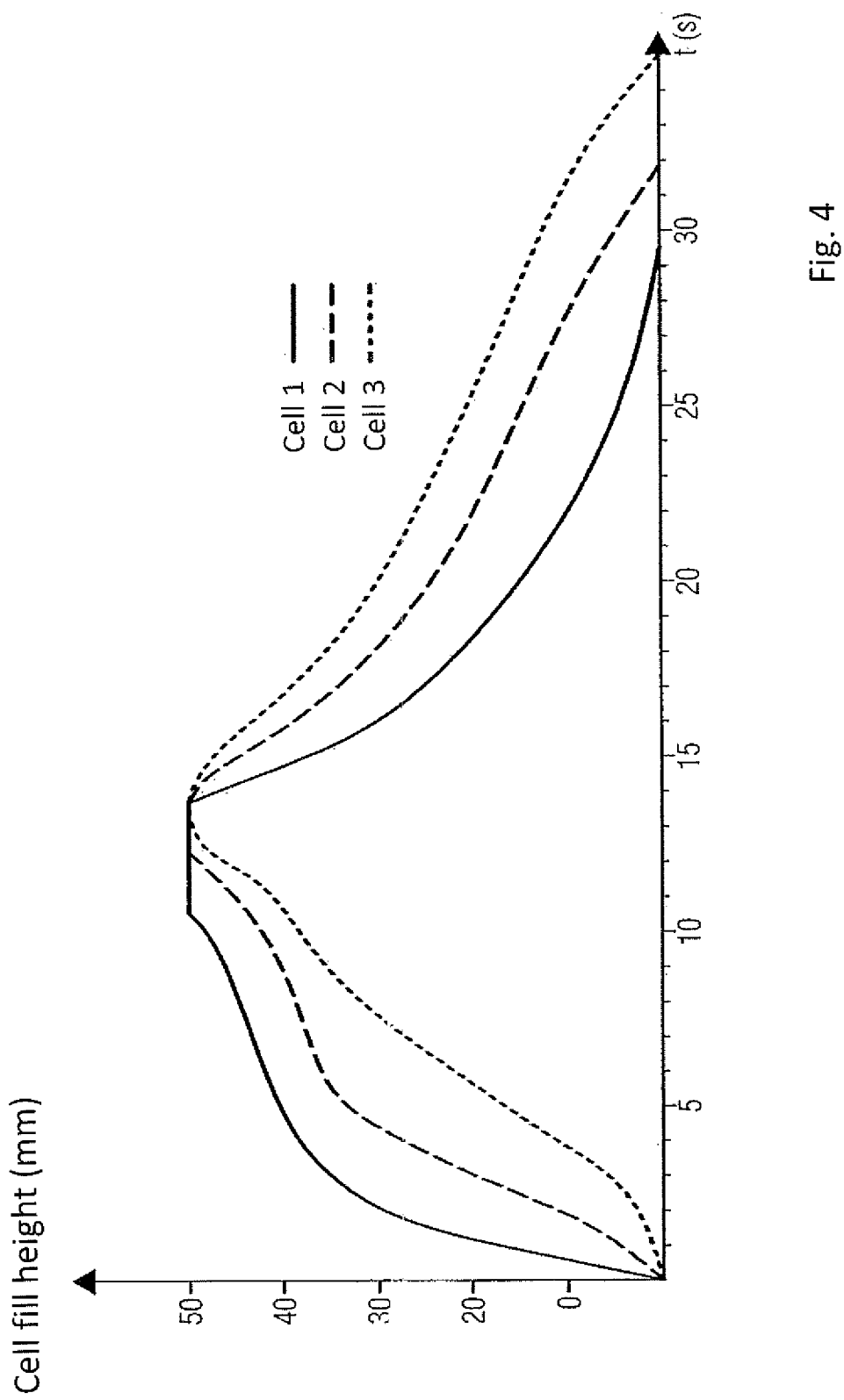
FIG. 4 shows a graph of the height of the primary and the secondary massage cells as a function of time during inflation and venting of the primary massage cell and the secondary massage cells of FIG. 3.
Figure 5:
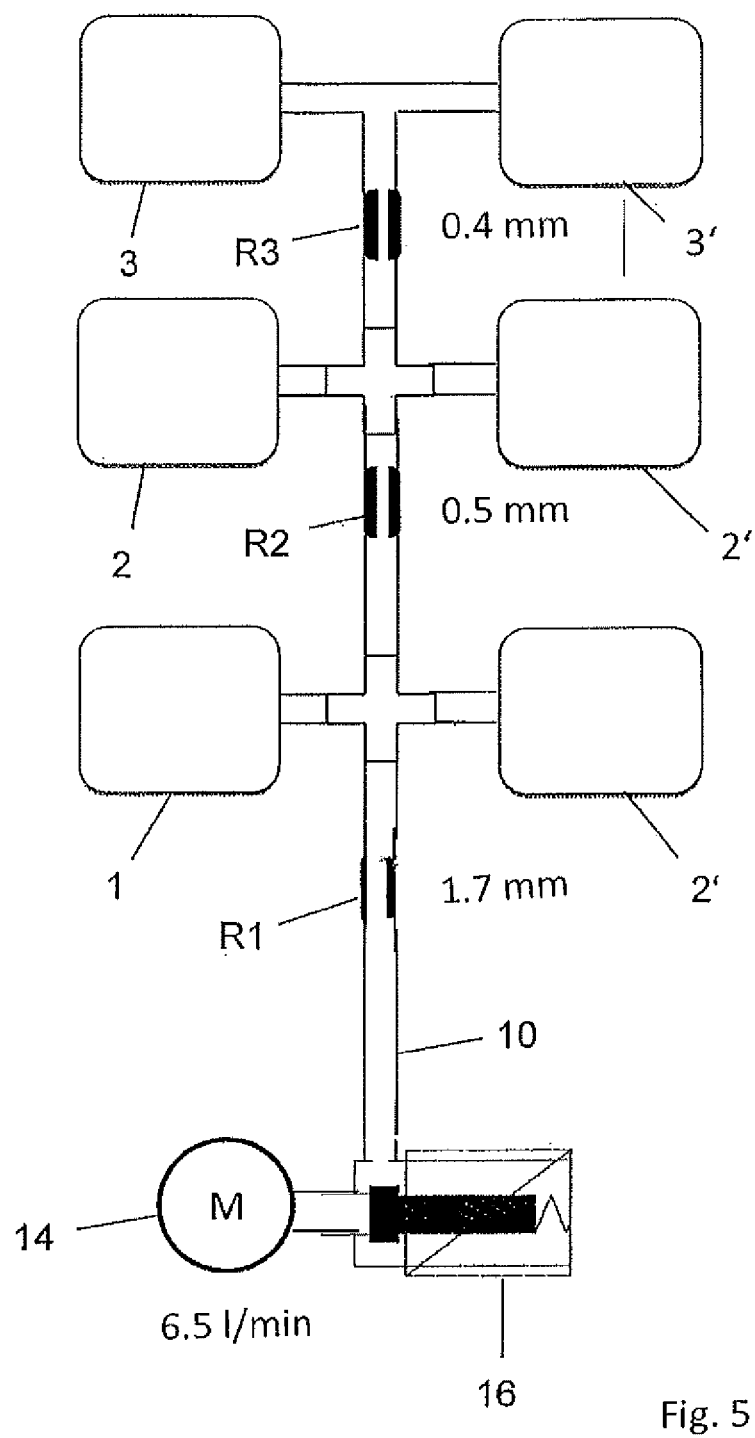
FIG. 5 shows a schematic view of an alternative unit having two parallel arrangements, each arrangement including a primary massage cell and two successive secondary massage cells.
Figure 6:
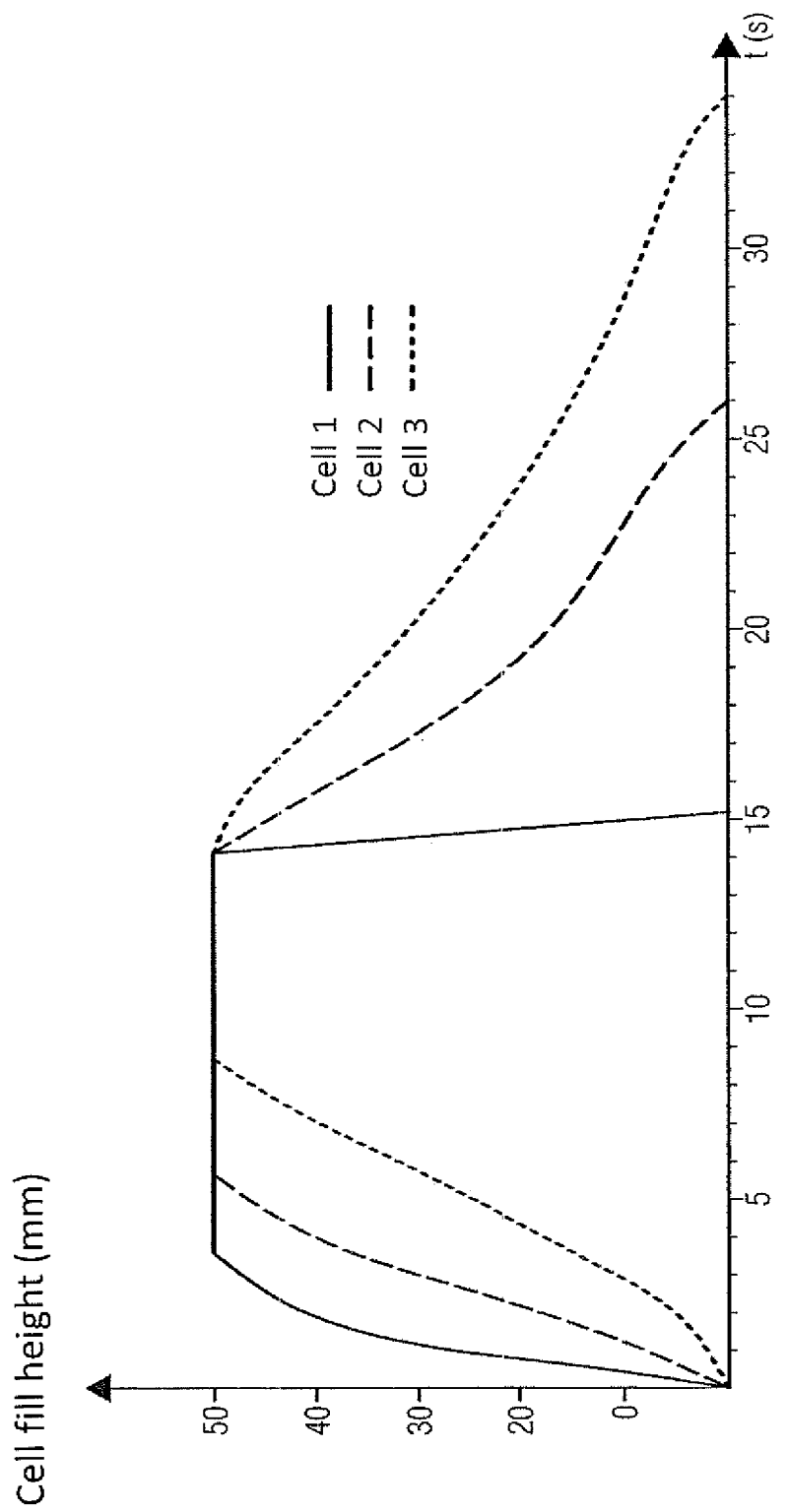
FIG. 6 shows a graph of the height of the primary and the secondary massage cells as a function of time during inflation and venting of the primary massage cell and the secondary massage cells of FIG. 5.

FIG. 5 shows a third example of a unit comprising two parallel primary massage cells 1, 1', two successive parallel secondary massage cells 2, 2' and two parallel further secondary massage cells 3, 3', which are supplied with air and vented, respectively, via the common supply and venting line 10. A difference with respect to the example of FIG. 3 is that there is no leakage opening with a flow restrictor to the environment. In FIG. 6 the fill state of the primary and secondary massage cells is shown as a function of time during an inflation and deflation cycle. As expected the rise of the fill state of the primary and secondary massage cells is steeper, i.e. the cells are filled more quickly compared to the example of FIG. 4, since no pressurized air is vented of through the leakage opening. Also the delay times between the primary cell 1 and the secondary cell 2, and between the secondary cell 2 and the further secondary cell 3 are slightly reduced.

FIG. 7 shows a unit comprising a primary massage cell 1, a successive secondary massage cell 2 and a further secondary massage cell 3. During inflation the common supply and venting line 10a is supplied with pressurized air from the pressurized air pump 14, wherein valve 16 is adjusted the supply and venting line 10a is closed with respect to the surrounding atmosphere. During venting the pressurized air pump 14 is switched off and the valve 16 is set to a position in which the supply and venting line 10a is open with respect to the surrounding atmosphere. The flow restrictor R1 is effective for all massage cells 1, 2 and 3 downstream thereof, whereas the flow restrictor R2 in the line 10a to the primary massage cell 1 is effective only for the primary massage cell 1, and wherein the flow restrictor R3 in the line 12a to the secondary massage cell 2 is effective for the latter only. For the further secondary massage cell the flow restrictors R1 and R4 are effective. Inflation and venting of the secondary massage cell 2 is delayed compare to the primary massage cell 1 because the effective inner diameter of flow restrictor R3 is smaller than the effective inner diameter of flow restrictor R2. The delay for the further secondary massage cell 3 is even larger since the effective inner diameter of flow restrictor R4 is as shown in the Figure even smaller than the effective inner diameter of R3.

Again, a massage device according to the present invention can be made up by a linear arrangement of several units as shown in FIG. 7 in a row, wherein in this case each unit as shown in FIG. 7 has its separate supply and venting line 10a. The longitudinal direction of the unit as shown in FIG. 7 coincides with the longitudinal direction of the linear series of the massage cell units, wherein in a massage device assembled from units as shown in FIG. 7, in longitudinal direction of the series in each case a sequence of a primary massage cell and two successive downstream secondary massage cells results, whereafter again a primary massage cell of the next unit follows and so on.

Figure 8:
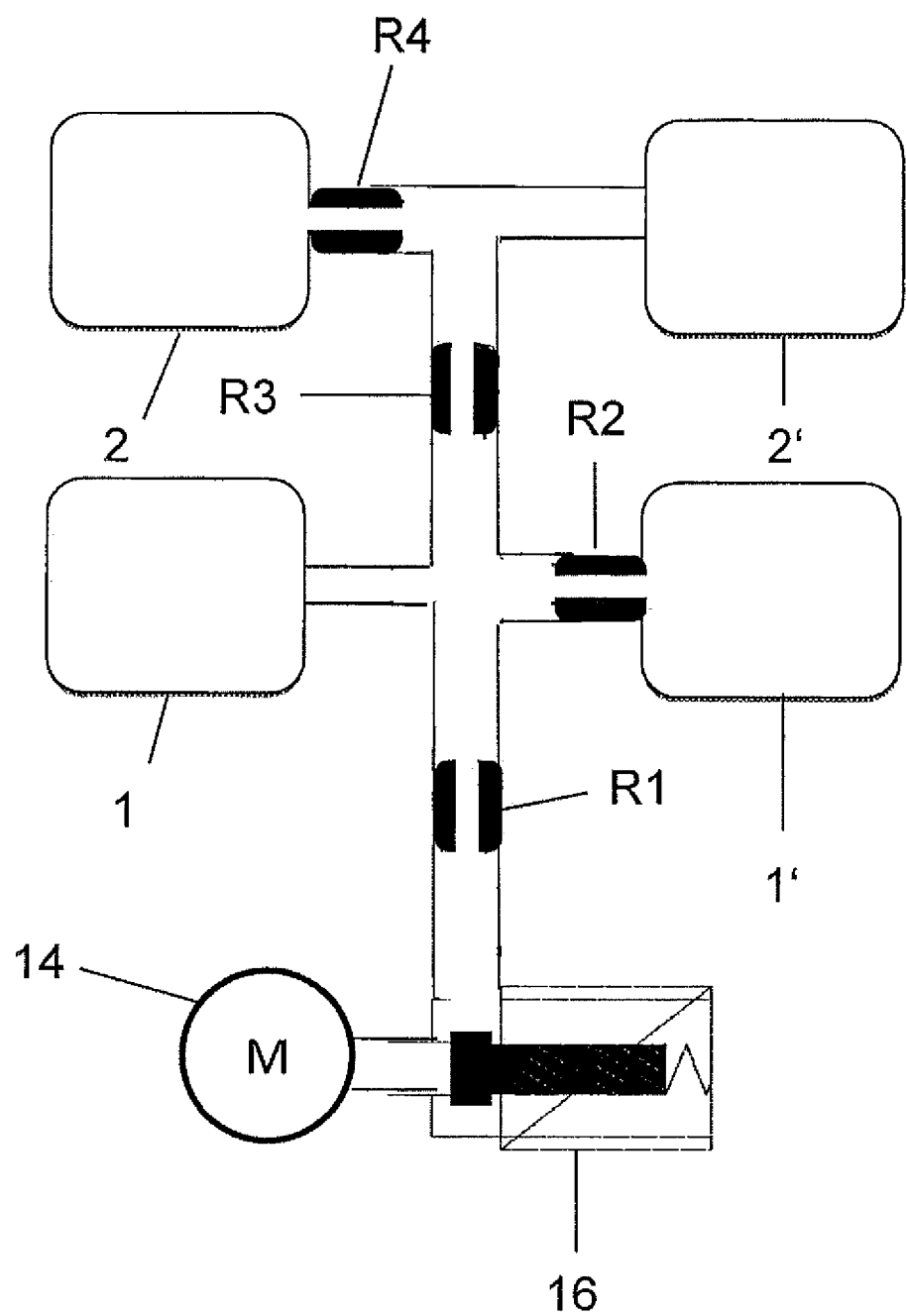
FIG. 8 shows a schematic view of an alternative unit comprising two parallel arrangements, each of which comprising a primary massage cell and a successive secondary massage cell.

FIG. 8 is an example of a unit comprising two parallel primary massage cells 1, 1' and two parallel secondary massage cells 2, 2', wherein here an asymmetrical inflation and venting of the two parallel series 1, 2 and 1', 2' takes place, because the flow restrictors R2 and R4 are disposed asymmetrically. Such units are also suitable to be assembled linearly in a row to form a longitudinally extending linear series of primary and secondary massage cells for a massage device according to the invention, wherein in this series in each case a primary massage cell 1, 1' alternates with a secondary massage cell 2, 2'.

Figures 9A, 9B, 10A, 10B:
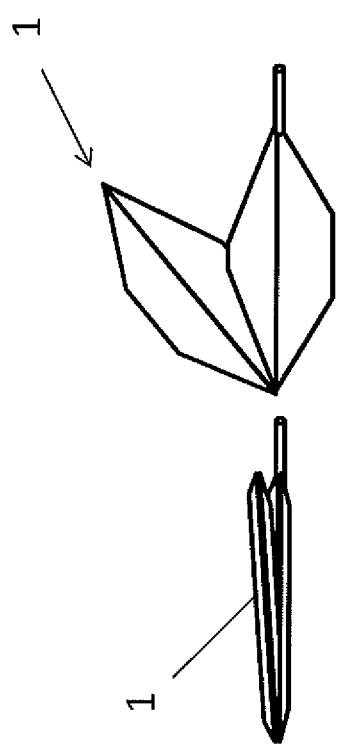
FIGS. 9A and 9B show schematic side views of a massage cell which may be utilized both as a primary and as a secondary massage cell, in respective deflated state and in an inflated state.
FIGS. 10A and 10B show schematic side view of a second embodiment of a massage cell which may be utilized both as a primary and as a secondary massage cell, in respective deflated and inflated states.

FIGS. 9A and 9B show schematic side views of an exemplary massage cell which can be utilized as a primary as well as a secondary massage cell in an exemplary massage device according to the invention. In FIGS. 9A and 9B an exemplary primary massage cell 1 is shown in the vented and in the inflated states, respectively. The primary massage cell 1 shown is formed by two folding bellow elements on top of each other. The interior of the folding bellow elements is continuous such that the massage cell 1 can be inflated and vented via a single line which opens into one of the folding bellow elements. The folding bellow elements are connected to each other on one side, in FIGS. 9A and 9B on the left hand side. Due to this configuration, during inflation an asymmetrical unfolding of the folding bellows elements takes place since the folding bellows elements can unfold and rise on one side only. Therefore, the primary massage cell is wedge-shaped in the inflated state, i.e. has on one side a greater height than on the opposing side. The successive primary and secondary massage cells of this wedge-shaped configuration are oriented in the linear series of the massage cells in the same manner, i.e. the higher side of all massage cells along the linear series is oriented in the longitudinal direction of the series in the same direction.

FIGS. 10A and 10B show further examples of a wedge-shaped primary massage cell 1 in the vented state and in the inflated state, respectively. This configuration of the massage cell can be utilized for the primary massage cells as well as for the secondary massage cells in a massage device according to the present invention. In this case the primary massage cell 1 comprises three folding bellows elements disposed on top of each other, which folding bellow elements are connected to each other on one side such that the folding bellow elements can unfold only on the opposing side during inflation, resulting in a pronounced asymmetrical unfolding.

From FIGS. 9A, 9B, 10A, and 10B it can be seen that the expansion of the primary massage cell 1 is accompanied by a rotary or pivotal movement component about the connected side of the massage cells. The asymmetrical wedge-shaped configuration of the massage cells 1 causes besides a vertical movement component upon inflation also a transversely directed movement component which is directed parallel to the surface of the backrest or the seat body. This additional transversely extending movement component of the massage cells causes an enhancement of the movement in propagation direction of a propagating bulge caused by sequential inflation, which bulge propagates in a wave-like manner in longitudinal direction of the series of massage cells. In this manner the wedge-shaped massage cells cause a transversely extending movement component which creates a force component acting transversely or parallel to the surface of a body portion in abutment on the seat cover 20 (see FIG. 1), for example from the lower and to the upper end along the back.

The wedge-shaped configuration of the primary and secondary massage cells of a massage device according to the present invention is particularly advantageous since the delay effect during inflation and deflation between primary massage cells and secondary massage cells on the one hand causes a wave-like propagating bulge and a subsequent lowering, which also can be viewed as a wave-like movement along the longitudinal direction of the linear series of primary and secondary massage cells. This movement in longitudinal direction of the series of primary and secondary massage cells resulting from a wave-like propagating bulge and lowering of the massage cells is enhanced by the wedge-shaped configuration of the primary and secondary massage cells since by this configuration an additional movement component in the longitudinal direction of the series of primary and secondary massage cell is added which coincides with the propagation direction of the wave-like propagating bulge. The wedge-shaped primary and secondary massage cells all are oriented in the same direction. If the side which is the lower side upon inflation is oriented in the propagation direction of a wave-like propagating bulge, the propagation direction of the wave-like bulge and the transversely directed movement component which is created by unfolding the pronouncedly asymmetrical primary and secondary massage cells upon inflation, are directed in the same direction and enhance each other.

FIGS. 11 to 16 show schematic side views of a unit comprising a primary massage cell and a successive secondary massage cell in a linear series of massage cells in subsequent states of an inflation and deflation cycle. To simplify the illustration only the inflation and venting of one unit comprising a primary massage cell 1 and a secondary massage cell 2 will be considered in an isolated manner, i.e. the secondary massage cell preceding on the left hand side and the next primary massage cell following on the left hand side are not inflated and deflated to simplify the illustration. To produce an inflation and deflation propagating along the longitudinal direction of the massage cells in a wave-like manner, the preceding primary massage cell and the following primary massage cell would have to be inflated and deflated in a timed manner such that their inflation and deflation would precede and follow, respectively, the inflation and deflation of the shown primary massage cell 1 and the successive secondary massage cell 2, but this is omitted to simplify the illustration.

In the view of FIG. 11 the primary massage cell 1 and the subsequent secondary massage cell 2 are still completely vented.

In FIG. 12 the primary massage cell 1 is already inflated to a large degree, whereas the following secondary massage cell 2 is still in the initial phase of expansion.

In FIG. 13 the primary massage cell 1 is fully expanded, whereas the following secondary massage cell 2 is still in the expansion phase.

In FIG. 14 both the primary massage cell and the secondary massage cell 2 are completely expanded or inflated. Thereafter, the deflation cycle starts by stopping supply of pressurized air and by opening the supply and venting line to the surrounding atmosphere.

In FIG. 15 the primary massage cell 1 is almost completely vented, whereas the secondary massage cell 2 is not yet vented to such a large degree. In the state shown in FIG. 16 the primary massage cell 1 is eventually completely deflated, whereas the secondary massage cell 2 is still in the final phase of deflation.

As already explained above the inflation and deflation of a primary massage cell and its associated secondary massage cell has been described here and is shown in the FIGS. 1 to 16 in an isolated manner. In order to realize a wave-like propagating inflation and deflation along the massage device, the preceding and the successive massage cells would have to be inflated and deflated in a timed sequence. Accordingly, in FIG. 12 a secondary massage cell adjacent to the primary massage cell 1 on the right hand side would still be in the final deflation phase, whereas in the phase shown in FIG. 14 the next primary massage cell following the secondary massage cell 2 on the left hand side would be already in the initial phase of inflation.

What is claimed is:

1. A massage device for a vehicle seat comprising:
   a linear series of inflatable massage cells arranged in succession and adapted to be disposed beneath a seat cover of the vehicle seat, the linear series of inflatable massage cells including a primary massage cell and at least one secondary massage cell arranged in succession to one another in a longitudinal direction;
   a common supply and venting line in communication with the primary massage cell and the at least one secondary massage cell;
   a compressed air pump connected to the common supply and venting line;
   a controllable valve for the controlled supply of compressed air to the linear series of inflatable massage cells and for the controlled venting of the linear series of inflatable massage cells;
   a control unit controlling the compressed air pump and the controllable valve, the control unit being arranged for carrying out massage functions by controlling the compressed air pump and the controllable valve according to a predetermined sequence set individually by a user for the controlled inflation and controlled venting of the linear series of inflatable massage cells; and
   a passive flow restrictor adapted to directly restrict flow in the common supply and venting line and spaced between the primary massage cell and a secondary massage cell of the at least one secondary massage cells such that inflation and deflation of the secondary massage cell follows the inflation and deflation of the primary massage cell with a predetermined time delay, wherein the passive flow restrictor is disposed upstream of the at least one secondary massage cell and downstream of the primary massage cell with respect to the compressed air pump.

2. The massage device according to claim 1, wherein the passive flow restrictor is configured such that the predetermined delay time between a point in time in which the primary massage cell reaches 80% of volume fill capacity, and a point in time in which the secondary massage cell reaches 80% of volume fill capacity is in the range between 0.2 seconds and 10 seconds.

3. The massage device according to claim 1, wherein the at least one secondary massage cell includes a second secondary massage cell successive in the linear series of inflatable massage cells, wherein the second secondary massage cell is in fluid communication with the secondary massage cell via the common supply and venting line, and wherein a second passive flow restrictor is constructed and arranged to directly restrict flow in the common supply and venting line between the secondary massage cell and the second secondary massage cell such that inflation and deflation of the second secondary massage cell follows inflation and deflation of the associated secondary massage cell with the predetermined time delay, and wherein the passive flow restrictor is positioned in series with the second passive flow restrictor.

4. The massage device according to claim 3, wherein the second passive flow restrictor is configured such that a delay time between a point in time when the secondary massage cell during inflation reaches eighty percent of maximum volume fill capacity, and a point in time when the second secondary massage cell during inflation reaches eighty percent of maximum volume fill capacity is in a range between 0.2 seconds and 10 seconds.

5. The massage device according to claim 1, wherein the primary and secondary massage cells are arranged to overlap in the longitudinal direction.

6. The massage device according to claim 5, wherein the primary and secondary massage cells co-extend in the longitudinal direction, and overlap one-another within a range of ten percent to seventy percent.

7. The massage device according to claim 1, wherein the primary and secondary massage cells are wedge-shaped when in an inflated state and viewed in cross-section through a plane parallel to the longitudinal direction.

8. The massage device according to claim 7, wherein a first side of each one of the primary and secondary massage cells is at least double the height of an opposite second side of each one of the primary and secondary massage cells when in the inflated stated.

9. The massage device according to claim 7, wherein the primary and secondary massage cells are folding bellows each having a lower side and an outer fold projecting from the respective lower side, and wherein the lower sides are connected and are collinear to one-another.

10. The massage device according to claim 9, wherein the primary and secondary massage cells define respective interior spaces in fluid communication with one-another to facilitate common inflation and common deflation.

11. The massage device according to claim 9, wherein the primary and secondary massage cells each include three folding bellows elements disposed on top of each other, and wherein each bellows element define an interior space and the interior spaces of the primary massage cell are in fluid communication with one-another to facilitate common inflation and deflation, and the interior spaces of the secondary massage cell are in fluid communication with one-another to facilitate common inflation and deflation.

12. A method of operating a massage device in a vehicle seat comprising:
providing a linear series of inflatable massage cells arranged in succession and disposed beneath a seat cover of the vehicle seat;
providing a common supply and venting line in fluid communication with the linear series of inflatable massage cells;
providing a compressed air pump connected to the common supply and venting line;
providing a controllable valve for the controlled supply of compressed air to the linear series of inflatable massage cells and the controlled venting of the compressed air from the linear series of inflatable massage cells;
providing a control unit configured to control the compressed air pump and the controllable valve;
defining a predetermined sequence for inflating and venting by a user; and
controllably inflating and deflating the linear series of inflatable massage cells according to the predetermined sequence, wherein the linear series of inflatable massage cells are aligned in succession along a longitudinal direction, wherein the linear series of inflatable massage cells include a primary massage cell and at least one secondary massage cell following the primary massage cell, and wherein a passive flow restrictor is disposed in the common supply and venting line and spaced between the primary massage cell and the at least one secondary massage cell to facilitate inflation and deflation of the secondary massage cell that follows inflation and deflation of the primary massage cell with a predetermined time delay established at least in-part by the flow resistance of the passive flow restrictor, wherein the passive flow restrictor is disposed upstream of the at least one secondary massage cell and downstream of the primary massage cell with respect to the compressed air pump.

13. The method according to claim 12, wherein a delay time between a point in time in which the primary massage cell reaches 80% of volume fill capacity, and a point in time in which a secondary massage cell of the at least one secondary massage cells reaches 80% of volume fill capacity is in the range between 0.2 seconds to 10 seconds.

14. The method according to claim 12, wherein the at least one secondary massage cell includes a second secondary massage cell successive in the linear series of inflatable massage cells, wherein the second secondary massage cell is in fluid communication with the secondary massage cell via the common supply and venting line, and a passive flow restrictor is disposed in the common supply and venting line between the secondary massage cell and the second secondary massage cell to facilitate inflation and deflation of the second secondary massage cell that follows inflation and deflation of the secondary massage cell by the predetermined time delay.

15. The method according to claim 12, wherein the primary massage cell and a secondary massage cell of the at least one secondary massage cell overlap one-another in the longitudinal direction, and wherein a second secondary massage cell of the at least one secondary massage cell overlaps the secondary massage cell in the longitudinal direction.

16. The method according to claim 15,
wherein the overlap of the primary massage cell with the secondary massage cell is within a range of ten percent to seventy percent.

17. The method according to claim 12, wherein the primary and secondary massage cells are each wedge-shape when inflated and viewed in cross-section through a plane parallel to the longitudinal direction.

18. The method according to claim 17, wherein the primary and secondary massage cells each include a high side and a low side, and the high side is at least twice higher than the low side when in the inflated state.

19. The method according to claim 17, wherein the primary and at least one secondary massage cells are each folding bellows.

20. The method according to claim 19, wherein the folding bellows include two folding bellows elements disposed on top of each other, and wherein each folding bellow element defines an interior space, and the interior spaces of the folding bellows are in fluid communication with one-another.

* * * * *